(No Model.)  3 Sheets—Sheet 1.

I. CUMBERBATCH.
FLUID PRESSURE REGULATOR.

No. 468,129. Patented Feb. 2, 1892.

Witnesses:—
D. H. Haywood
C. E. Sundgren

Inventor:—
Isaac Cumberbatch
by attorneys
Brown & Seward (No Model.) 3 Sheets—Sheet 2.

I. CUMBERBATCH.
FLUID PRESSURE REGULATOR.

No. 468,129. Patented Feb. 2, 1892.

Witnesses:-
D. H. Haynord
C. E. Sundgren

Inventor:-
Isaac Cumberbatch
by attorneys
Brown & Seward (No Model.) 3 Sheets—Sheet 3.
I. CUMBERBATCH.
FLUID PRESSURE REGULATOR.
No. 468,129. Patented Feb. 2, 1892.
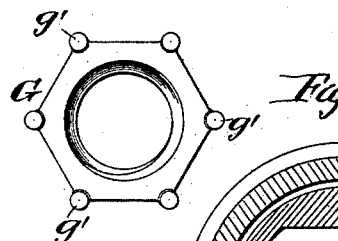
Fig. 3.
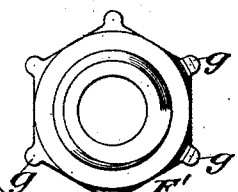
Fig. 5.
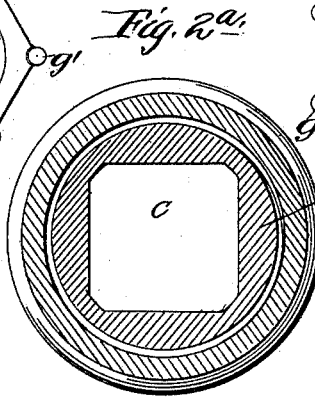
Fig. 2ᵃ
Fig. 4.
Fig. 6.
Fig. 7.
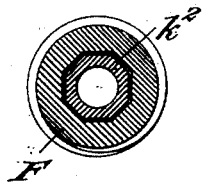
Fig. 1ᵃ
Witnesses:-
D. H. Haywood
C. E. Sundgren
Inventor:-
Isaac Cumberbatch
by attorneys
Brown Seward

UNITED STATES PATENT OFFICE.

ISAAC CUMBERBATCH, OF NEWARK, NEW JERSEY.

FLUID-PRESSURE REGULATOR.

SPECIFICATION forming part of Letters Patent No. 468,129, dated February 2, 1892.

Application filed June 3, 1891. Serial No. 394,956. (No model.)

*To all whom it may concern:*

Be it known that I, ISAAC CUMBERBATCH, of Newark, in the county of Essex and State of New Jersey, have invented a new and useful Improvement in Reducing-Pressure Valves, of which the following is a specification.

My invention relates to an improvement in reducing-pressure valves in which a valve is held in a yielding manner and subject to the varying pressure upon the low-pressure side of the valve to close or open it, according as the pressure upon said low-pressure side is increased or diminished.

My present invention has more particularly for its object an arrangement by which the expansible and contractible hollow diaphragms may be readily coupled and uncoupled from one another and the construction of the valve and its adjusting-rod and their connection with each other and with the group of hollow diaphragms, whereby the valve may be regulated rapidly and with great precision, and at the same time be less liable to derangement if tampered with or carelessly handled.

A practical embodiment of my invention is represented in the accompanying drawings, in which—

Figure 1:
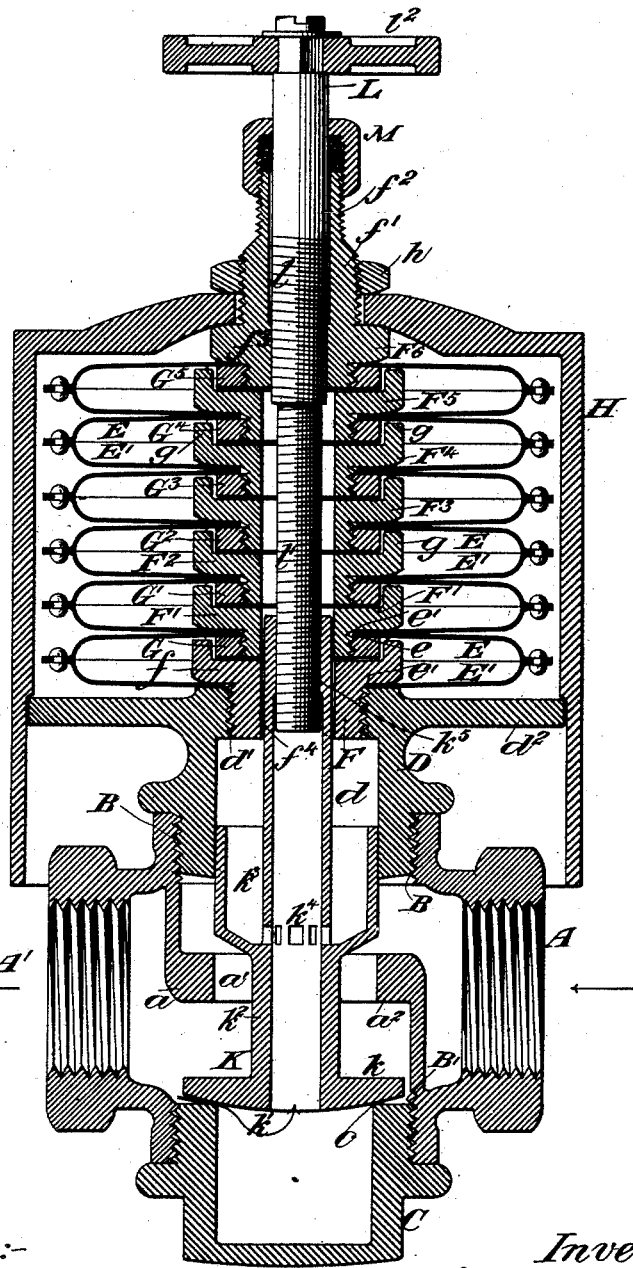
Figure 2:
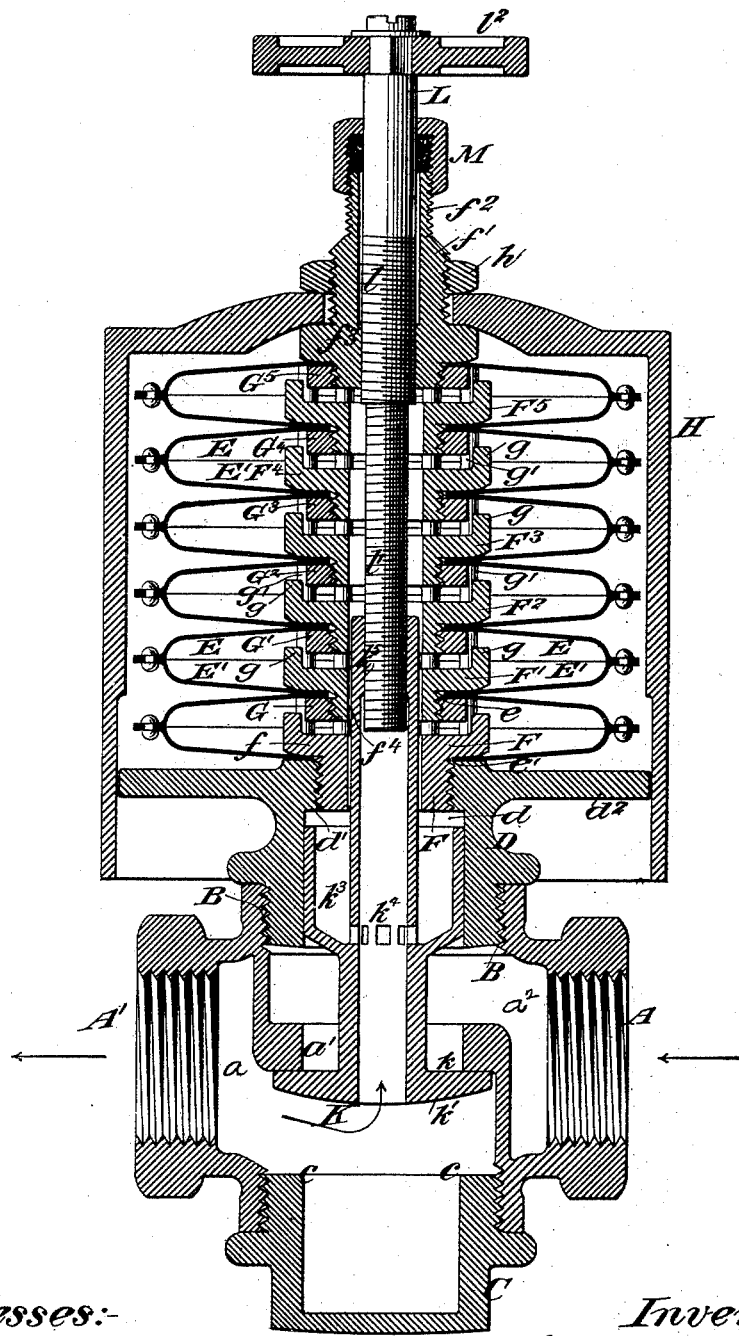

Figure 1 is a view of a valve in vertical section, the valve being shown as wide open. Fig. 2 is a similar view, the valve being shown as fully closed. Figs. 3, 4, 5, 6, and 7 represent views in detail of the two parts of the coupling for uniting the hollow diaphragms. Fig. 1$^a$ is a view in detail showing the polygonal-shaped opening in the lower coupling-thimble to receive the polygonal-shaped valve-stem, and Fig. 2$^a$ is a view in detail of a transverse section through the hollow plug which crosses the opening opposite the valve.

The inlet end of the pipe-section to which the valve is attached is represented by A and the outlet by A'. The space between the inlet and outlet ends is divided into two chambers by a division-wall $a$, through which there is an opening $a'$, around the margin of which the seat $a^2$ is located for the reception of the valve to form a closure of the opening $a'$.

The pipe-section is provided with an interiorly-screw-threaded opening B at one side, in the present instance the upper side, and in alignment with the opening $a'$, and on its opposite side is provided with an interiorly-screw-threaded opening B'. The opening B' is of such diameter as to admit of the insertion of the valve therethrough, and is closed by means of a screw-threaded cap or hollow plug C, the space within which is provided with mouth $c$, angular-shaped in cross-section, portions of the margin of which form a stop to limit the throw of the valve in the direction to open the corners of the said angular-shaped mouth, at the same time establishing at all times communication between the low-pressure side of the valve-opening $a'$ and the space within the cap, because of the convex shape of the lower face of the valve, which fails to close the corners of the mouth of the space within the cap, even when the valve is full open.

The opening B has fitted thereto a hollow plug D, the lower portion of which is provided with an enlarged chamber $d$, adapted to receive the enlarged portion of the valve-stem, and its upper end being provided with an interiorly-screw-threaded opening $d'$ for the reception of the screw-threaded nipple on one of the hollow-diaphragm coupling-sections. The upper portion of the plug D extends laterally, forming a circular plate $d^2$, preferably somewhat greater in diameter than the diameter of the hollow diaphragms.

The hollow diaphragms are each formed of two half-sections E and E', of thin metal of dish-form, placed with their concave faces toward each other and having their flanges riveted together to form an air-tight joint. The sections E E' are provided with central openings $e$ and $e'$. Through the lower opening $e'$ a screw-nipple F extends and screws into a threaded socket. The nipple F is provided with an enlarged head $f$, and when screwed home clamps the diaphragm-section E' between it and the margin of the socket, into which it is screwed, so as to form a tight joint. In the case of the lower diaphragm-section the screw-nipple F is screwed into the perforation $d'$ in the upper end of the plug D. In the case of the section above the section E' and the said coupling-nipples F' F$^2$, &c., screw into coupling-nuts G G', &c., and clamp between their enlarged heads and the adjacent faces of the coupling-nuts, the diaphragm-plates which form the upper section of one of the hollow diaphragms, and the lower section of the next succeeding diaphragm. In this manner a pile of hollow diaphragms is set up, consisting of any desired number, six being shown in the present instance as being adapted to general use. The uppermost nut $G^5$ has screwed therein a nipple or plug $F^6$, provided with an extended exteriorly-screw-threaded shank $f'$ of larger diameter and a still further exteriorly-screw-threaded extension $f^2$ of lesser diameter. Upon the enlarged head of the nipple $F^6$ the bell-shaped cover H rests, the threaded shank $f'$ of the nipple extending loosely through an opening in the top of the cover, and the cover itself extending down over the pile of hollow diaphragms and around the margin of the plate $d^2$, forming a complete protection for the diaphragms. A nut $h$ is adapted to screw onto the enlarged screw-threaded stem $f'$ of the plug $F^6$ and lock the cover H in position. The lower portion $f^3$ of the nipple $F^6$ is provided with an interior screw-thread adapted to engage a corresponding thread upon the valve-adjusting rod, and the interior of the lower nipple F is preferably formed polygonal in cross-section, as shown in Fig. 1$^a$, to receive the valve-stem and prevent the valve from rotating.

The heads of the nipples F F', &c., and the margins of the nuts G G', &c., are provided, respectively, with lugs $g$ and $g'$, which, when the parts are assembled, interlock (see Fig. 7) and prevent any nipple and nut into which it is screwed from rotating together with respect to the nipple next below them, so that the hollow diaphragms may be separated readily at any point desired for the introduction of an additional diaphragm or for the renewal or repair of one of those already in use, or for any purpose that may be required.

The valve is represented by K and is provided with a flat upper face $k$ and a convex lower face $k'$. The valve-stem $k^2$ is hollow, the opening therein extending through the face of the valve. At a distance from the valve sufficient to prevent the closure of the opening $a'$ when the valve is full open the valve stem $k^2$ is enlarged, forming a cup-shaped portion $k^3$, adapted to fit and slide within the chamber $d$ within the plug D. The cup-shaped portion $k^3$ is preferably formed hollow, and openings $k^4$ through the valve-stem into the hollow cup-shaped portion $k^3$ serve to establish communication between the interior of the valve-stem and the exterior of the said stem within the space $d$. The valve-stem $k^2$ extends upwardly within the nipple F, where it is formed polygonal in cross-section to loosely fit the polygonal-shaped opening $f^4$ in the nipple F. The fit of the upper portion of the stem $k^2$ within the opening $f^4$ is intended to be sufficiently loose to admit of the passage of air or steam past it into the central openings in the plugs and nuts which unite the hollow-diaphragm sections, and provision is made to keep at all times open communication between the faces of the coupling nuts and plugs, so as to establish communication between the interior of said coupling nuts and plugs and the interiors of the hollow diaphragms. The upper end of the hollow stem $k^2$ is provided with an interior screw-thread $k^5$, adapted to receive the lower end of the screw-threaded valve-adjusting rod.

The valve-adjusting rod is represented by L and is provided with a larger screw-threaded portion $l$ and a smaller screw-threaded portion $l'$. The larger screw-threaded portion $l$ is adapted to register with the interiorly-screw-threaded portion $f^3$ of the nipple $F^6$, while the smaller screw-threaded portion $l'$ is adapted to register with the screw-threaded portion $k^5$ of the hollow valve-stem. The pitch of the screw-threads on the larger portion $l$ and the smaller portion $l'$ is in opposite directions, so that when the adjusting-rod is turned in one direction it will simultaneously force itself outwardly through its engagement with the nipple $F^6$, lift the valve toward its seat, and at the same time, by its engagement with the valve-stem, will cause the valve to travel toward its seat relatively to the adjusting-rod, thereby causing an increased travel of the valve, while the adjusting-rod itself moves but a short distance. In the same manner, when the adjusting-rod is turned in the opposite direction, the valve will be moved away from its seat, both by the movement of the adjusting-rod in that direction and also by the movement of the valve relatively to the rod. The rod L extends through a suitable stuffing-box M, screwed onto the neck $f^2$ of the nipple $F^6$, and is conveniently provided with a hand-wheel $l^2$ for operating it. Not only is the travel of the valve in its opposite directions, increased beyond the movement of the rod L by the oppositely-pitched screw-threaded portions, but the said adjusting-rod is locked in its position with respect to the valve, so that it may not be unscrewed and the valve thereby deranged, since when the valve reaches its seat it will be impossible to turn the adjusting-rod farther, provided the diaphragms are in their collapsed adjustment, without breaking the rod or tearing the thread. On the other hand, when it is desired to set the valve at an unusually high tension it may be thrown open until it rests upon its stop, as in Fig. 1, and the adjusting-rod may then be turned in the direction tending to throw it still farther open, the effect of which will be to expand the hollow diaphragms, so that when acted upon by the back-pressure it will need a higher pressure than ordinary to throw the valve toward its seat.

What I claim is—

1. The combination, with the hollow diaphragms, of couplings for uniting the diaphragms in series, said couplings each consisting of sections constructed to engage each other, the adjacent sections of two consecutive couplings being provided with interlocking lugs, whereby the turning of one section of the coupling may be accomplished without the turning of the other section of the coupling, substantially as set forth.

2. The combination, with the hollow expansible and contractible diaphragms arranged in series, of couplings for uniting the diaphragms, said couplings comprising a nut and a screw-threaded nipple, the said nut and the nipple of the next succeeding coupling being provided with interlocking projections, whereby one member of a coupling may be turned to screw or unscrew it without turning the other member of the coupling, substantially as set forth.

3. The combination, with the valve, the expansible and contractible diaphragms, and their supports, of a valve-adjusting rod having a screw-threaded engagement with the valve and with the expansible and contractible diaphragms, the screw-thread at the engagement with the valve having a pitch opposite to that of the screw-thread at the engagement with the diaphragm, whereby the valve is caused to travel relatively to the valve-adjusting rod at the same time that the valve-adjusting rod is caused to travel and in the same direction, substantially as set forth.

4. The combination, with the valve provided with its hollow stem opening through the face of the valve and with an enlarged portion on the stem, of a valve-seat and a stop to limit the throw of the valve in its direction to close and open, a plug provided with a chamber adapted to receive the enlarged portion of the stem, the stem being provided with openings to establish communication between its interior and the said chamber, a plug or nipple provided with an angular-shaped opening to loosely receive the angular-shaped portion of the end of the valve-stem, expansible and contractible diaphragms for regulating the action of the valve, and a valve-adjusting rod having a threaded engagement with the diaphragms and with the interior of the valve-stem, substantially as set forth.

ISAAC CUMBERBATCH.

Witnesses:
FREDK. HAYNES,
C. E. LUNDGREN.